Sept. 27, 1966 G. E. NICHOLS 3,275,280
EASEL-TYPE MOUNT
Filed Oct. 20, 1964 4 Sheets-Sheet 1
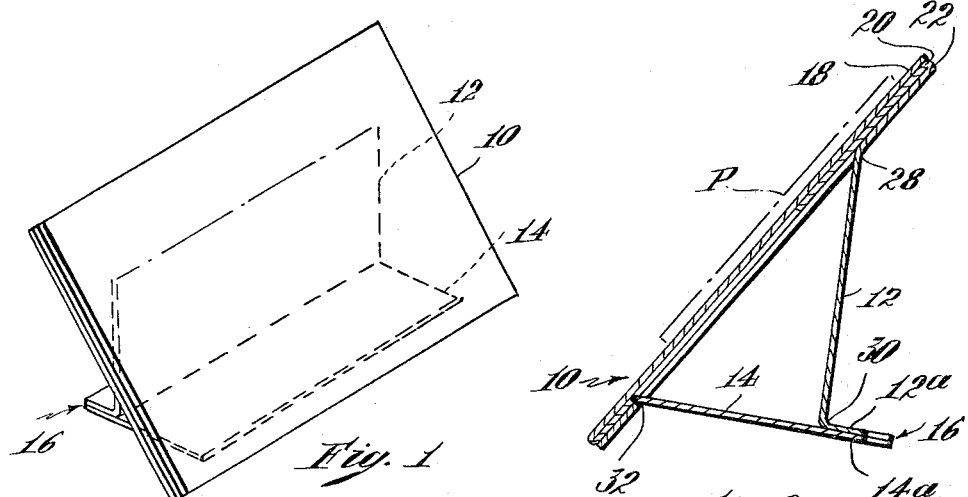
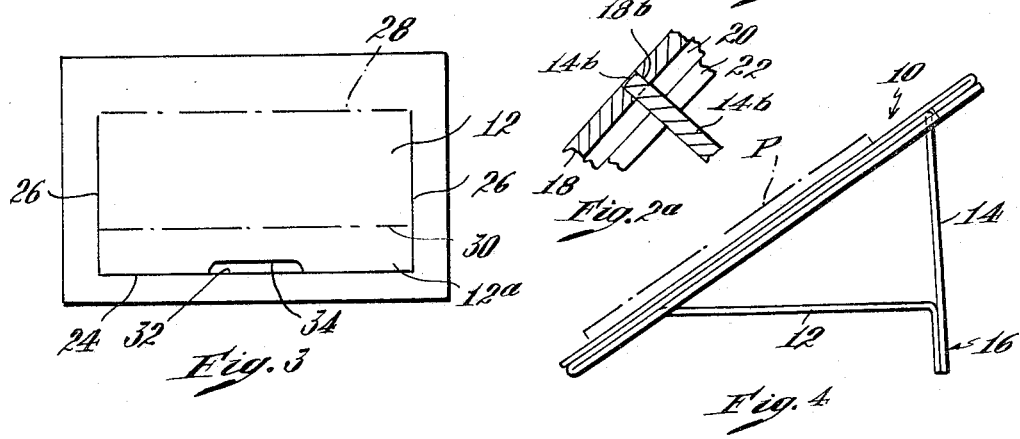
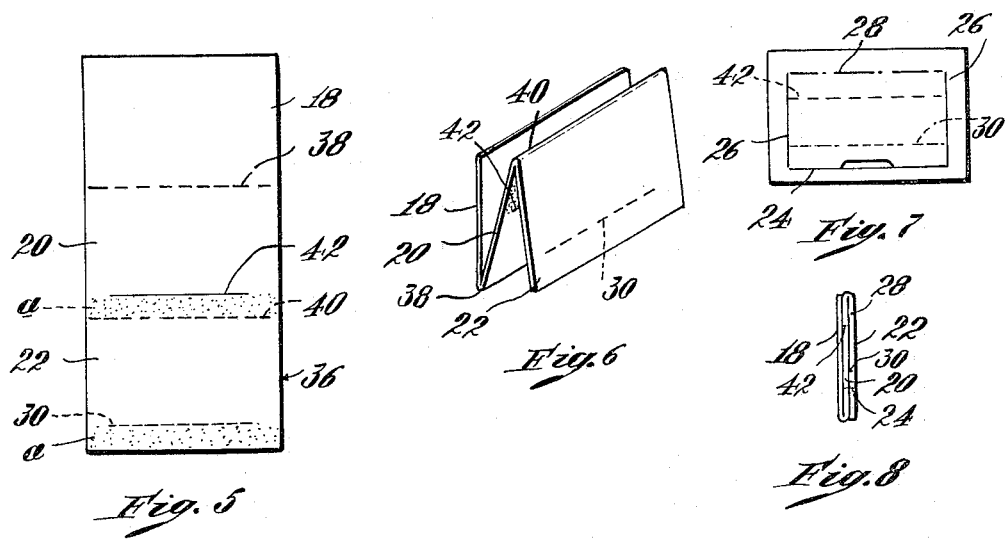

Sept. 27, 1966 G. E. NICHOLS 3,275,280
EASEL-TYPE MOUNT
Filed Oct. 20, 1964 4 Sheets-Sheet 2
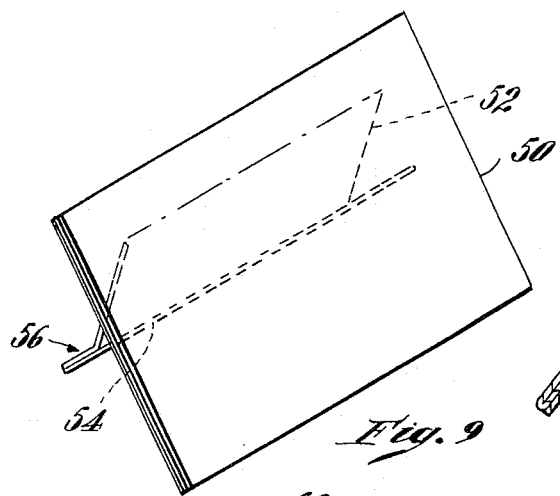
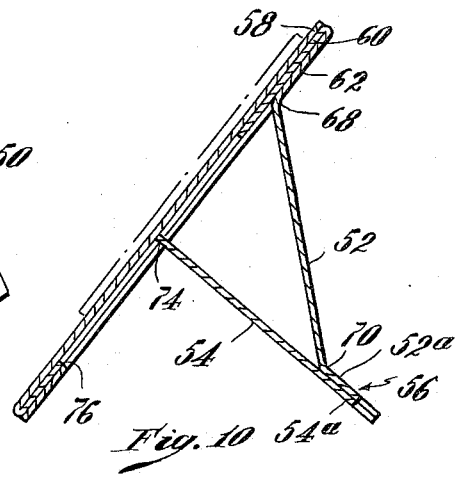
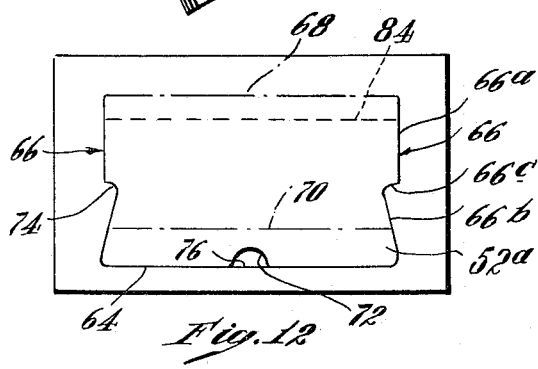
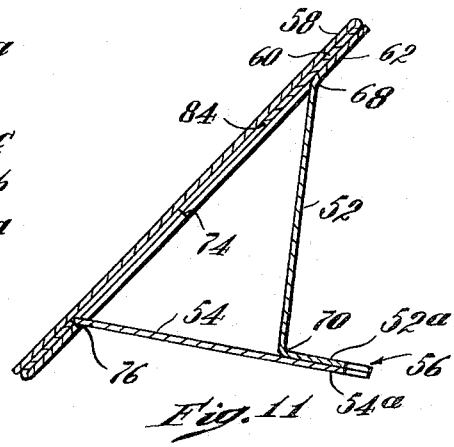
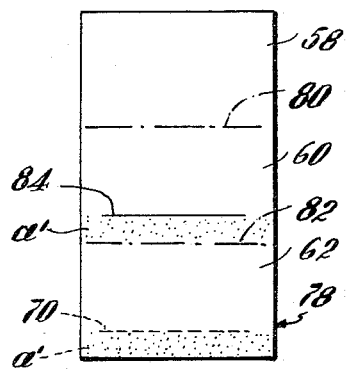
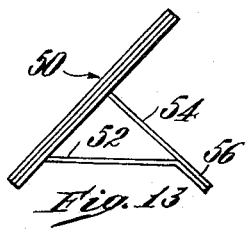
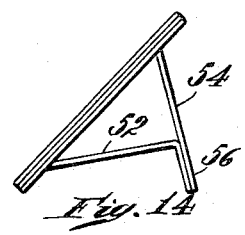
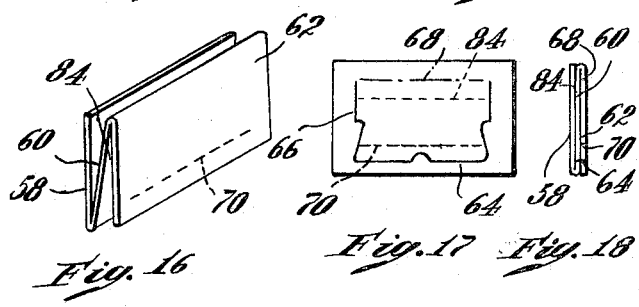

Sept. 27, 1966 G. E. NICHOLS 3,275,280
EASEL-TYPE MOUNT
Filed Oct. 20, 1964 4 Sheets-Sheet 3
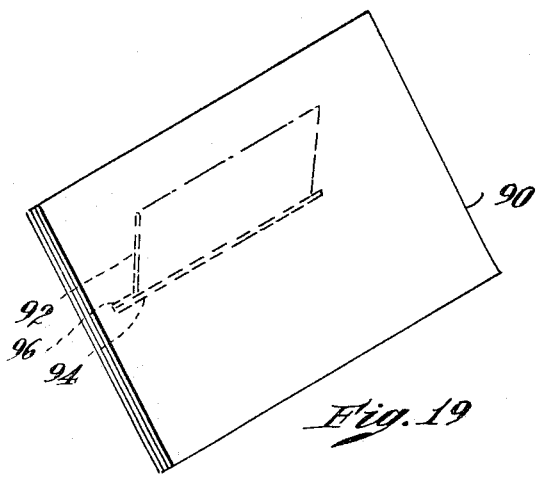
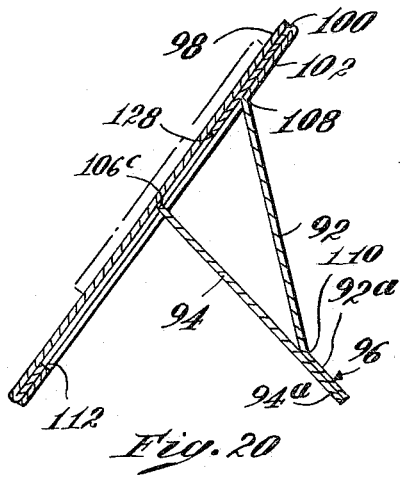
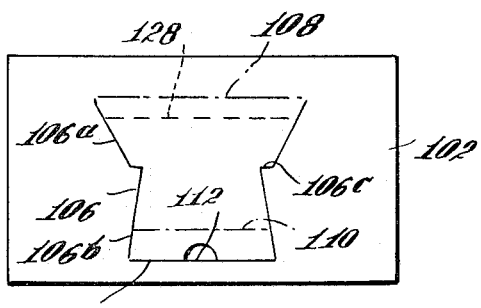
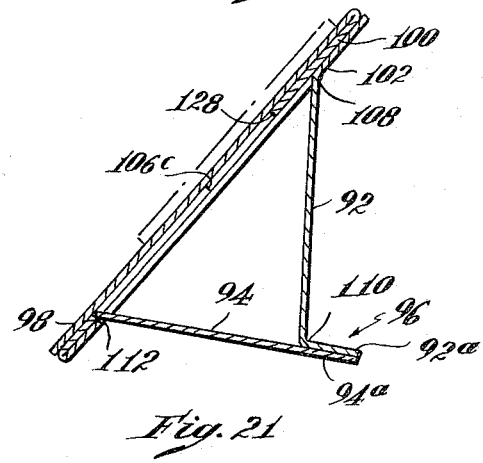
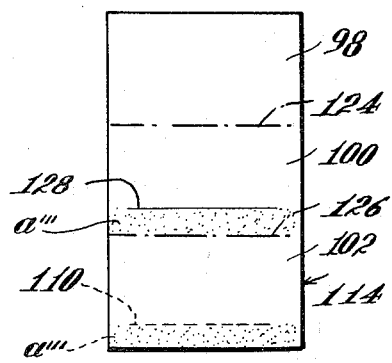
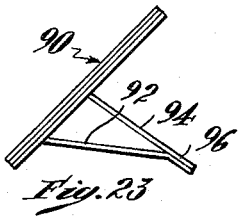
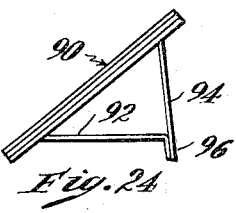
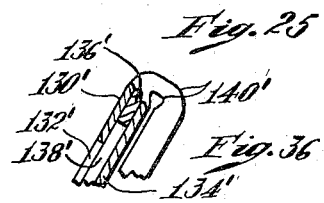
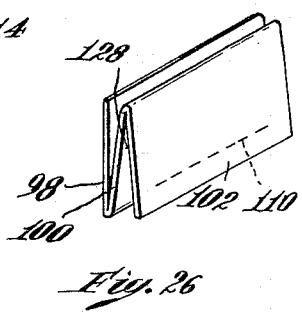
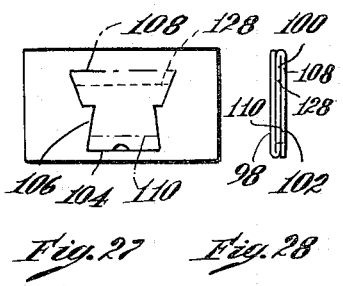

Sept. 27, 1966 G. E. NICHOLS 3,275,280
EASEL-TYPE MOUNT
Filed Oct. 20, 1964 4 Sheets-Sheet 4

United States Patent Office 3,275,280
Patented Sept. 27, 1966

3,275,280
EASEL-TYPE MOUNT
Gordon E. Nichols, Middleboro, Mass., assignor to Winthrop-Atkins Co., Inc., Middleboro, Mass., a corporation of Massachusetts
Filed Oct. 20, 1964, Ser. No. 405,148
12 Claims. (Cl. 248—459)

This invention relates to structures designed to support a calendar pad, photograph, or the like, and, in particular, to an easel-type structure supported in an upright, rearwardly inclined position.

The principal objects of the invention are to provide a structure which, when folded, permits perfectly flat packaging and in which all of the component parts are contained within the sides and ends so that there are no projecting parts; to provide a structure which is susceptible of a number of attractive arrangements by different disposition of its component parts without change in its basic make-up; to provide a structure which is susceptible to manufacture solely by simple die-cutting and gluing operations; to provide a structure, the setting up of which is at once apparent; to provide a structure which is stable and durable; and to provide a simple and expedient method of making the structure with conventional readily available die-cutting and gluing machinery.

As herein illustrated, the structure comprises a support, first and second parts extending rearwardly from the support at angles thereto such that they intersect, a third part hinged to the distal end of the first part, said third part being secured in parallel relation to a portion of corresponding area at the distal end of the second part and forming with the portion of the second part to which it is secured a foot located rearwardly of the intersection of the first and second parts for supporting the support. The proximal end of the second part is unconnected to the support and the foot provides means for rotating the second part from an operative position wherein its proximal end abuts the support so as to hold the first part at an angle to said support, to an inoperative position between the support and the first part wherein it is parallel to the support. The first part is connected by a hinge to the support of a kind which resists rearward displacement of the first part so that the reactive force presses the proximal end of the second part against the rear side of the support, and the latter has on it means for supporting the proximal end of the second part. The supporting means may comprise spaced parallel shoulders alternately engageable with the proximal end of the second part to hold the latter at different levels with respect to the support. The structure comprises at least two plies of stiff board joined face-to-face, the first part extending rearwardly from one of the plies and the second part extending rearwardly from the other of the plies through an opening in the one ply. A third ply may be employed so that there are front, intermediate and rear plies and, when so constructed, the first and second parts are cut out of the rear and intermediate plies and the second part extends through the opening in the intermediate ply and bears upon the rear side of the front ply. The shoulders for supporting the proximal end of the second part project inwardly from the sides of the opening in the intermediate ply or may be supported from the upper edge of the opening. Optionally, the proximal end of the second part may have a tongue engageable with a hole in the front ply.

The blank of which the structure is made comprises a rectangular board containing a continuous cut score part way through the board from one side parallel to its ends, a perforated cut score from the same side parallel to the ends, the continuous cut score and perforated cut score being spaced so as to divide the board into first, second and third sections of substantially equal area, a cut in each of the second and third sections, each of which terminates short of the sides of the board, the cut in the second section extending through the board and the cut in the third section extending part way through the board from the one side if the board is not to be wrapped and all of the way through if the board is to be wrapped, and a stripe of adhesive on the one side of the board adjacent each of the cuts in the second and third section.

The method of making the mount comprises cutting part way through a rectangular blank from one side and perforating the blank from the same side so as to divide the blank into first, second and third parts of equal area, cutting completely through the second part and part way through the third part from the one side intermediate the sides, or all the way through if a wrapper is to be applied thereto, applying adhesive to the second and third parts adjacent the cuts therein, folding the first part to bring it into engagement with one side of the second part folding the third part to bring it into engagement with the other side of the second part, adhesively securing the second and third parts to each other by pressing the adhesive-coated areas thereof into engagement, indenting the third part parallel to the fold between the second and third parts, and then cutting through the second and third parts along a line parallel to the cut in the third part and spaced parallel lines intersecting the latter cut and the indentation in the third part. If a wrapper is applied the cuts will sever the wrapper.

The invention will now be described in greater detail with reference to the accompanying drawings wherein:

FIG. 1 is a perspective of the structure in its simplest form;

FIG. 2 is a vertical section from front-to-back of FIG. 1;

FIG. 2a is a fragmentary section illustrating a modification in which the proximal end of the second part is provided with a tongue for interengagement with a slot in the support;

FIG. 3 is a back view of the folded structure;

FIG. 4 is an end elevation of the structure turned over;

FIG. 5 is a plan view of the blank from which the structure is made;

FIG. 6 shows the blank partially folded;

FIG. 7 shows the blank entirely folded, impressed to provide a hinge and cut to free the second and third parts;

FIG. 8 is an edge view showing the incisions necessary to form the structure;

FIG. 9 is a perspective of another form of the structure;

FIG. 10 is a vertical section from front-to-back of FIG. 9;

FIG. 11 is a vertical section from front-to-back showing a redisposition of the parts;

FIG. 12 is a rear view of the structure folded;

FIG. 13 is an elevation of the structure shown in FIG. 10 turned over;

FIG. 14 is an end elevation of the structure shown in FIG. 11 turned over;

FIG. 15 is a plan view of the blank from which the structure is made;

FIG. 16 shows the first step in folding;

FIG. 17 shows the blank finally folded, impressed to provide a hinge and die-cut to free the first and second parts;

FIG. 18 shows an edge view of the folded blank incised;

FIG. 19 is a perspective view of another form of the invention;

FIG. 20 is a vertical section from front-to-back of FIG. 19;

FIG. 21 is a vertical section from front-to-back of FIG. 19 with the parts repositioned;

FIG. 22 is a back view of the folded blank;

FIG. 23 is an end elevation of the structure shown in FIG. 20 turned over;

FIG. 24 is an end elevation of the structure shown in FIG. 21 turned over;

FIG. 25 is a plan view of the blank;

FIG. 26 shows the blank partially folded;

FIG. 27 shows the folded blank impressed to provide a hinge and cut to form the first and second parts;

FIG. 28 is an edge view of FIG. 27;

FIG. 36 is a fragmentary elevation partly in section showing a multiple panel connected to the upper edge of support.

Figure 29:
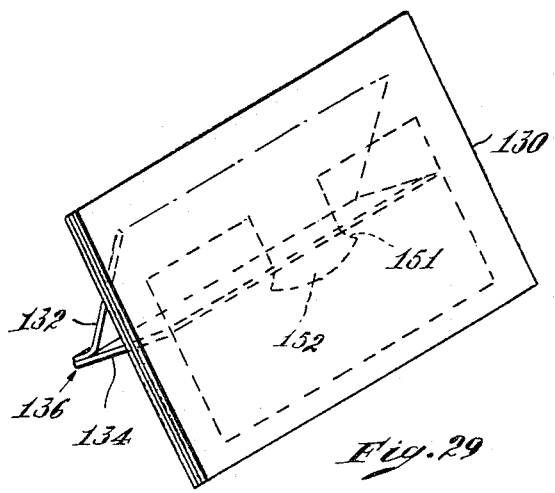
FIG. 29 is a perspective of another form of the structure.

In its simplest form, the structure comprises a support 10 supported in an upright, rearwardly inclined position by parts 12 and 14 extending rearwardly therefrom, and a foot 16 formed at the intersection of the parts 12 and 14 which is rotatable with respect to the part 12 to position the part 14 alternatively between the support 10 and the part 12 when the structure is folded, or with its proximal end engaged with the rear side of the support when the parts are set up. The foot 16 is comprised of a part 12a hinged to the distal end of the part 12 and a part 14a of corresponding area at the distal end of the part 14 to which the part 12a is secured face-to-face.

The support 10 comprises coextensive plies 18, 20 and 22 joined in whatever fashion is most appropriate, for example by wrapping of the edges in conventional fashion; by the use of adhesive between the interfaces; or by the insertion of staples or stitches. The parts 12 and 12a are severed from the ply 22 by cutting through the ply 22 along a line 24 parallel to the lower edge of the ply 22 and along transversely spaced lines 26 parallel to the ends of the ply 22, and are connected to the ply 22 and to each other by hinges 28 and 30 parallel to the upper and lower edges.

The part 14 is cut out of the ply 20, as will appear hereinafter, and the part 14a is secured to the part 12a by adhesive, staples, or the like.

The lower edge of the opening from which the parts 14, 14a are cut provides a horizontal shoulder 32 upon which the proximal end of the part 14 is adapted to be disposed and to be supported thereby, and the hinge 28 which is formed by indenting the ply 22 operates, by its resistance to displacement of the part 12 rearwardly from the support, to force the proximal end of the part 14 against the rear side of the ply 18, so that the part 14 is yieldingly held against rearward displacement and positively held against downward displacement by the shoulder 32. The foot 16 provides means for conveniently rotating the part 14 into and out of operative position and to enable disengaging it from the folded position which, because of its structural make-up is flush with the rear surface of the ply 22, is provided with a notch 34.

The structure shown in FIGS. 1 and 2 is of such proportion that the support slopes upwardly at a relatively sharp angle however the structure may be turned over, that is, from the position shown in FIG. 2 by rotation in a clockwise direction to assume the position shown in FIG. 4 wherein the support is situated at a flatter angle. In either case the support is adapted to have fastened thereto a calendar pad or photograph p.

The structure is of relatively simple make-up and particularly adapted to simple die-cutting and gluing operations. Starting with a blank 36 (FIG. 5) of conventional paperboard stock, spaced parallel cuts 38 and 40 parallel to the ends are made to divide the blank into three parts of substantially equal area corresponding, respectively, to the plies 18, 20 and 22. The cut 38 is a cut score made part way through the board from the bottom side, as seen in FIG. 5, and the cut 40 is a perforated score made from the same side. Both of these cuts extend all the way across the board from one side to the other. Two cuts 30 and 42 are now made in the parts 22 and 20 respectively. The cut 30 is made part way or all the way through from the bottom side depending upon whether or not a wrapper is to be employed. When no wrapper is used, the cut is made only part way through. When a wrapper is to be applied, the cut is made all the way through, in which case the wrapper provides the hinge. The cut 42 is also made all of the way through. Both cuts correspond substantially in length to the width of the part 14. A stripe of adhesive a is now applied to the bottom side of each of the parts 22 and 20 next to the cuts 30 and 32, the stripes extending beyond the ends of the cuts to the edges of the blank.

The parts 18 and 22 are now folded in opposite directions so as to have contact with the opposite faces of the part 20 as shown in FIG. 6. As thus folded, these parts constitute the front ply 18, the intermediate ply 20 and the rear ply 22 in the finished structure. The interfaces of the plies 20 and 22 are secured to each other by the adhesive a. The front ply 18 is secured to the intermediate ply by means of adhesive, staples, stitching, wrapping, and the like. When a wrapper is employed it is applied to the entire outer face of the ply 22, folded over the edges of the plies and secured to the outer face of the ply 18.

The folded structure FIG. 7 is now subjected to indenting to form the hinge 28 and by cutting to form the cuts 24 and 26 through the rear ply and through the intermediate ply and in conjunction with the cut 42 completely sever the parts 14, 14a from the intermediate ply. The notch 34 is cut out of the parts 12 and 14 when making the cuts 24, 26. When the parts 14, 14a are severed from the intermediate ply they are left secured to the part 12 by the adhesive attachment of the part 12a to the part 14a. Since the cut 30 is made from the inside the foot 16 folds rearwardly and thus enables easily rotating the part 14 into and out of operative position. An even more flexible hinge is provided when a wrapper is employed and the cut 30 is made all the way through the board.

Since the hinge 28 is made by indenting the board from the outside, the part 12 resists outward displacement sufficiently to provide a restorative force which tends to hold the proximal end of the part 14 engaged with the support.

A modification of the support for the proximal end of the part 14 is shown in FIG. 2a wherein the proximal end has a tongue 14b engaged with a slot 18b in the ply 18. This, of course, requires modification of the cut 42 to form the tongue and providing a slot in the ply 18.

The structure shown in FIGS. 9 to 18, inclusive, is similar to that shown in FIGS. 1 to 8, inclusive, and comprises a support 50 which is supported in an upright and rearwardly inclined position by parts 52 and 54 which extend rearwardly therefrom, and a foot 56 formed at the intersection of the parts 52 and 54 which is rotatable with respect to the part 52 to position the part 54 alternately between the support 50 and the part 52 when the structure is folded or with its proximal end engaged with the rear side of the support when the structure is set up. The foot 56 is comprised of a part 52a hinged to the distal end of the part 52 and a part 54a of corresponding area at the distal end of the part 54.

The support 50 has a front ply 58, an intermediate ply 60 and a rear ply 62. The parts 52 and 52a are formed out of the rear ply 62 by a cut 64 made parallel to the lower edge and transversely spaced cuts 66 adjacent the ends of the ply and are connected to the ply 62 and to each other by hinges 68 and 70 parallel to the upper edge. The cuts 66 comprise parallel portions 66a and converging portions 66b which are connected with the parallel portions by laterally extending curved portions 66c. The part 54 is cut out of the intermediate ply 60 along four sides so as to separate it completely from the ply as will appear hereinafter. The foot 56 is formed by securing the part 52a to a corresponding area 54a of the part 54 and provides means for pulling the parts rearwardly from the plies 60 and 62 and rotating the part 54 to a position such that its proximal end abuts the rear side of the front ply 58. The edge of the foot is notched at 72 to enable lifting the foot out of the recesses in the intermediate and back plies 60 and 62.

In this form of the invention, the part 54 is adapted to be disposed in two different positions, a position in which the proximal end is substantially midway between the top and bottom edges of the support as shown in FIG. 10, or a position in which it is close to the lower edge of the support as shown in FIG. 11. In the first position the proximal end of the part 54 is supported by engagement with the upper sides of shoulders 74 which project into the opening formed when the parts 52 and 56 are cut therefrom. The hinge 68, which is formed by indenting the ply 62, is resistant to displacement of the part 52 rearwardly from the support and hence forces the proximal end of the part 54 against the rear side of the front ply 58. The shoulders 74 support the proximal end of the part 54 heightwise, thus providing a stable structure. The structure may be turned over in a clockwise direction with reference to the lower end of the foot to a position such as shown in FIG. 13.

In the second position the part 54 is positioned with its proximal end resting on a shoulder 76 parallel to the lower edge of the support. In this position also, the reactive force of the hinge 68 holds the proximal end of the part 54 engaged with the rear side of the ply 58 and the shoulder 76 to support it heightwise. The structure as shown in FIG. 11 may also be tipped over in a clockwise direction as shown in FIG. 14.

The structure is comprised of a blank 78 (FIG. 15) cut along lines 80 and 82 to provide three sections of substantially equal area corresponding to the plies 58, 60 and 62 of the support. The cut 80 is a score cut made from the bottom side part way through and extending from one side to the other. The cut 82 is a perforated score made from the same side and extends from one side to the other. Two cuts 70 and 84 are made in the parts 62 and 60 respectively. The cut 70 is made part way through from the bottom side if no wrapper is to be employed or all the way through if a wrapper is to be employed. The cut 84 is made all the way through. These cuts do not extend to the side edges and stripes of adhesive a' are applied to the bottom side of each of the parts 60 and 62 adjacent the cuts 84 and 70.

The blank is folded as shown in FIG. 16 with the parts 58 and 62 at opposite sides of the part 60 so as to form the front ply 58, the intermediate ply 60 and the rear ply 62. The intermediate and rear plies are secured to each other by the adhesive a'. The front ply is secured to the intermediate ply by conventional fastening means, for example, by a wrapper sheet coextensive with the outer face of the ply 62 and folded over the edges of the plies onto the outer face of the ply 58.

The folded blank, as shown in FIG. 17, is then subjected to an impressing operation to form the hinge 68 and cutting to make the cuts 64 and 66 through the plies 60 and 62 so as to free the part 52 from the rear ply and the part 54 from the intermediate ply along four sides. Freeing the part 54 from the intermediate ply leaves it supported by the part 52 by the adhesive engagement of the parts 54a and 52a. If a wrapper is employed the hinge 70 is constituted by the portion of the wrapper connecting the parts 52, 52a.

A third form of the invention is illustrated in FIGS. 19 to 28, inclusive, wherein the structure comprises a support 90 supported in an upright, rearwardly inclined position by parts 92 and 94 extending rearwardly therefrom, and a foot 96 formed at the intersection of the parts 92, 94 which is rotatable with respect to the part 92 to position the part 94 alternatively between the support 90 and the part 92 when the structure is folded, or with its proximal end engaged with the rear side of the support when the structure is set up. The foot 96 is comprised of a part 92a hinged to the distal end of the part 92, and a part 94a of corresponding area at the distal end of the part 94 with which the part 92 is secured face-to-face.

The support is comprised of a front ply 98, an intermediate ply 100 and a rear ply 102. The parts 92 and 92a are formed out of the rear ply 102 by a cut 104 parallel to the lower edge and transversely spaced cuts 106, and are connected to the part 102 and to each other by hinges 108 and 110 parallel to the upper edge. The transverse cuts 106 comprise oppositely converging portions 106a and 106b extending toward each other from the hinge 108 and the cut 104, and are joined by cuts 106c parallel to the cut 104. The part 94 is cut out of the intermediate ply 100 along four sides, as will appear hereinafter, and a part 94a, corresponding in area to the part 92a, is secured to the part 92a face-to-face so as to provide the foot 96. The foot provides means by which the part 92 may be pulled rearwardly from its recess in the rear ply 102 and for rotating the part 94 to dispose its proximal end into abutting engagement with the rear side of the front ply 98.

In this form of the invention the part 94 also has two possible positions, a position substantially midway between the upper and lower edges as shown in FIG. 20, or a position adjacent the lower edge as shown in FIG. 21. The proximal end of the part 94 is supported in the first position by engagement with shoulders 106c which project into the opening from which the part 92 is cut. As in the previously described forms of the invention, the hinge 108 is formed by indenting the board and tends to force the proximal end of the part 94 against the rear side of the part 98 and the shoulders 106c support it heightwise so that the structure is stable. The structure as shown in FIG. 20 may be turned over in a clockwise direction as shown in FIG. 23.

In the other position of the part 94, the proximal end rests on a shoulder 112 parallel to the lower edge of the support and this may be turned over as shown in FIG. 24.

The structure is comprised of a blank 114, as shown in FIG. 25, cut along spaced parallel lines 124 and 126 so as to provide the three parts 98, 100 and 102 which constitute the plies of the support and are of substantially equal area. The cut 124 is made from the bottom side and is a cut score part way through the blank extending from one side to the other. The cut 126 is a perforated score made from the same side and extends from one side to the other. Two cuts are made, one in each of the parts 100 and 102, a cut 128 through the part 100, and a cut 110 part way or all the way through the part 102 from the bottom side. The cut 110 is made part way through when no wrapper is to be employed and all the way through when a wrapper is employed. The cuts 128 and 110 terminate short of the edges. Adhesive a''' is applied to each of the parts 100 and 102 at the bottom side adjacent the cuts 128 and 110.

The blank is folded as shown in FIG. 26 to place the parts 98 and 102 at opposite sides of the part 100 so as to form front, intermediate and back plies 98, 100 and 102. The intermediate and back plies are joined by the adhesive and the front ply is secured to the intermediate ply. The folded blank, as shown in FIG. 27, is subjected to an indenting operation and cutting operation to form the hinge 108 and release the parts 92, 92a, 94 and 94a.

The cuts 106 penetrate the back and intermediate plies, intersecting the ends of the cut 128 so as to sever the parts 94, 94a from the intermediate ply, leaving the part 94 secured to the part 92 by the adhesive engagement of the parts 94a with the part 92a. A wrapper may be applied to the entire outer face of the ply 102, folded over the edges of the plies and secured to the outer face of the ply 98. When a wrapper is employed the cuts penetrate the wrapper on the face of the ply 102 so that the portion of the wrapper connecting the parts 92, 92a provides the hinge 110, since as pointed out above when a wrapper is used the cut 110 is made all the way through.

Another form of the invention is shown in FIGS. 29 to 35, inclusive, comprising a support 130 which is held in an upwardly, rearwardly inclined position by parts 132 and 134 which extend rearwardly therefrom, and a foot 136 formed at the intersection of the parts 132, 134 which is rotatable with respect to the part 132 to position the part 134 alternatively between the support 130 and the part 132 when the structure is folded, or with its proximal end engaged with the rear side of the support when the structure is set up. The foot 136 is comprised of a part 132a hinged to the part 132 and a part 134a of corresponding area at the distal end of the part 134 secured face-to-face to the part 132a.

The support 130 is comprised of a front ply 138, intermediate ply 140 and rear ply 142. The parts 132 and 132a are of substantially rectangular configuration and are formed out of the rear ply by a cut 144 parallel to the lower edge and transversely spaced, substantially parallel cuts 146 adjacent the side edges, and are connected to the ply 142 and to each other by hinges 148 and 150. The part 134 is cut out of the intermediate ply 140 along four sides, as will appear hereinafter, and the part 134a is joined face-to-face with the part 132a to form the foot 136. The foot 136 provides means for pulling the parts 132 and 134 rearwardly from their recesses in the intermediate and rear plies and for rotating the part 134 to a position to place its proximal end in abutting engagement with the rear side of the front ply 138.

Figure 30:
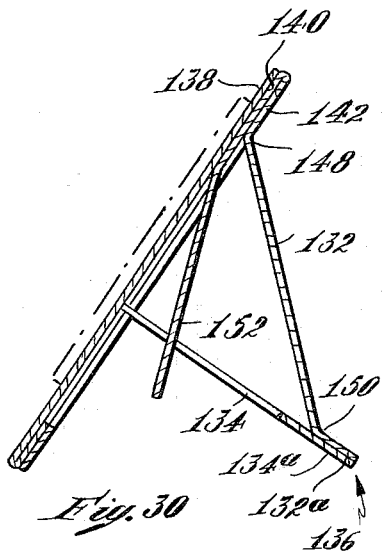
FIG. 30 is a vertical section from front-to-back of FIG. 29.
Figure 31:
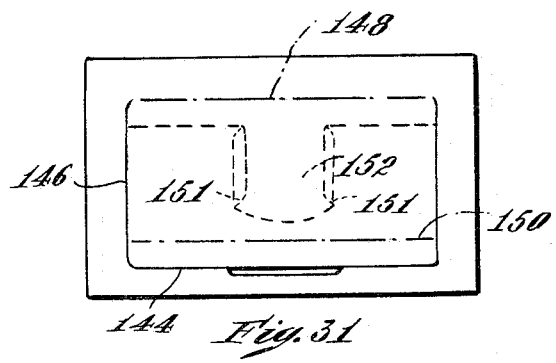
FIG. 31 is a back view of the structure folded.

In this form of the invention the resistance of the hinge 148, which is formed by indenting the board, to rearward displacement of the part 132 operates to force the proximal end of the part 134 against the rear side of the front ply 138. The heightwise position of the proximal end of the part 134 is determined by engagement thereof with a pair of outwardly extending shoulders 151 formed at the lower end of a hanger 152 integral with the intermediate ply 140, and extending downwardly into the opening from which the part 134 is cut. The part 134 contains an opening from which the hanger is cut, enlarged to provide sufficient clearance to enable disengaging the hanger therefrom. Rotation of the part 134 pulls the hanger rearwardly from the ply 138 as shown in FIG. 30, so that the sides of the opening will rest on the outwardly extending shoulders 151. Since the hanger is integral with the ply 140, the latter resists rearward displacement and hence assists in holding the proximal end of the part 134 engaged with the part 138.

Figure 32:
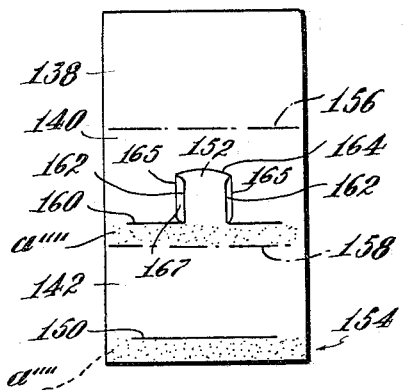
FIG. 32 is a plan view of the blank.
Figure 34:
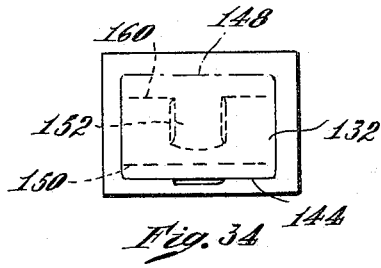
FIG. 34 shows the blank impressed to provide a hinge and cut to form the first and second parts.
Figure 35:
FIG. 35 is an edge view of FIG. 34.

The structure is formed of a blank 154, as shown in FIG. 32, by making cuts at 156 and 158 to divide the blank into three sections corresponding to the parts 138, 140 and 142 which form the front, intermediate and rear plies of the support. The cut 156 is a cut score part way through the blank from the bottom side and the cut 158 is a perforated score cut from the same side. The part 140 is cut through along lines 160, parallel to the perforated cut 158 and along lines 162, 164 and 165 to form the hanger 152 and the enlarged opening about it. The cuts 165 permit removing the sections 167 which provide the clearance referred to above. The cut 150 is made part way through the blank from the bottom side if no wrapper is to be employed and all of the way through if a wrapper is to be employed. Adhesive a'''' is applied to the bottom side of each of the parts 140 and 142 adjacent the cuts 160 and 150.

Figure 33:
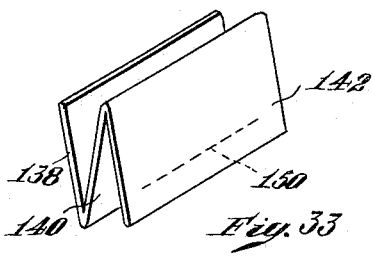
FIG. 33 shows the blank partially folded.

The blank is folded, FIG. 33, so that the parts 138 and 142 are at opposite sides of the part 140 thereby forming the front, intermediate and rear plies 138, 140 and 142. The parts 140 and 142 are adhesively secured to each other and the part 138 secured to the part 140. A wrapper may be applied to the entire outer surface of the part 142 over the edges of the plies and onto the surface of the part 138. The folded blank is then subjected to indentation and cutting operations to form the hinge 148 and to cut through the rear and intermediate plies to form the parts 132, 132a, the hanger 152 and the parts 134, 134a. Separation of the parts 134, 134a from the intermediate ply leaves the part 134 supported by the adhesive engagement of the parts 134a and 132a. The sections 167 are left in place to support the plies for printing.

The folded support constructed as shown in any one of the structures may have a pad or photograph attached to the outer face of the front ply or may be connected along its upper edge in spaced parallel relation to an edge of a multiple panel adapted to hang down over the outer face of the front ply. The multiple panel may embody a face board 130' containing a window opening 132' held spaced from a back board 134' by an intermediate board 136' to provide a pocket 138' behind the face board for receiving a calendar pad or picture. Conventionally the multiple panel may be connected to the support by a wrapper sheet 140' extending from the support to the panel as shown in FIG. 36.

The several structures have in common the advantage of having a supporting foot operative in either one of two possible positions to support the support in an upwardly and rearwardly inclined position for attachment of a calendar pad or picture to the front face thereof; the advantage that each of the structures is foldable to provide a perfectly flat, substantially uniformly rectangular package with none of the parts projecting from the faces or from the sides or ends thus enabling stacking for shipment and/or mailing in individual envelopes; to provide a structure, the setting up of which is at once apparent on inspection; and to provide a structure which entails only the simplest manufacturing operation by means of conventional die-cutting and glue-applying machinery. In two of the forms there is the additional advantage of being able to reposition the foot with respect to the support so that each mount has four possible positions of use.

In all instances, the structure may be partially or wholly covered with a decorative wrapping of suitable color and while adhesive is the most expedient means for joining the parts because it may be applied with a conventional gluing machine, the parts may be joined by stapling, stitching, or other equivalent means.

It should be understood that the present disclosure is for the purpose of illustration only and that this invention includes all modifications and equivalents which fall within the scope of the appended claims.

I claim:

1. A structure comprising at least two plies of stiff board joined face-to-face to provide a rigid panel, a first part extending rearwardly from one of the two plies, a second part extending rearwardly from the other of the two plies through an opening in said one ply, said parts intersecting rearwardly of the panel, a third part hinged to the distal end of the first part, and means securing the third part in parallel relation to a portion of corresponding area at the distal end of the second part, said third part forming with the portion of the second part, to which it is secured, a foot, located rearwardly of the intersection of the first and second parts, for supporting the panel, the proximal end of said second part being unconnected to the panel, and said foot providing means for rotating said second part from an operative position with its proximal end abutting the rear side of the panel, to an inoperative position situated entirely within said opening in said other ply forwardly of the one ply.

2. A structure according to claim 1, wherein a third ply is secured over the opening in said other ply and the proximal end of said second part has abutting engagement with the rear side of said third ply.

3. A structure according to claim 1, wherein there are shoulders extending inwardly from the sides of the opening in the rear ply with which the proximal end of the second part is engaged.

4. A structure comprising a plurality of plies joined face-to-face to provide a rigid panel having at least a front ply, an intermediate ply and a back ply, said intermediate and back plies containing openings, a first part corresponding in size to the opening in the back ply connected to one side of the opening and extending rearwardly from the panel at an angle thereto, a second part corresponding in size to the opening in the intermediate ply extending rearwardly from the front ply through the opening in the intermediate ply toward the first part and intersecting the latter rearwardly of the back ply, a third part hinged to the distal end of the first part, and means securing the third part in parallel relation to a portion of corresponding area at the distal end of the second part, said third part forming with the portion of the second part, to which it is secured, a foot, located rearwardly of the intersection of the first and second parts, for supporting the panel, the proximal end of said second part being unconnected to the panel, and said foot providing means for rotating the second part from a position with its proximal end abutting the rear side of the panel, to a position situated within the opening in the intermediate ply between the front and back plies.

5. A structure according to claim 4, comprising shoulders projecting inwardly from the sides of the opening in the intermediate ply with which the proximal end of the second part is adapted to be engaged.

6. A structure according to claim 4, comprising means extending into the opening in the intermediate ply with which the proximal end of the second part is adapted to be engaged to support the latter in its operative position abutting the rear side of the panel.

7. A blank for making a mount comprising a rectangular board containing a continuous cut score part way through the board from one surface parallel to the ends, and a perforate cut through the board parallel to the ends, said cuts dividing the board into first, second and third parts of substantially equal area, cuts in the second and third parts adjacent and parallel to the perforate cut connecting the second and third parts and the distal end of the third part respectively, each of the last two cuts terminating short of the edges of the board, the cut in the third part being closer to the distal end thereof than the perforate cut connecting the second and third parts, and a stripe of adhesive applied to the surface of the board adjacent each of the last two cuts.

8. A blank according to claim 7, wherein the stripe of adhesive extends the full width of the board and covers the area between the cut in the second part and the perforate cut joining the second and third parts and between the cut score in the third part and the distal end thereof.

9. A blank for making a mount comprising a rectangular board containing a continuous cut score part way through the board from one surface parallel to the ends, a perforate cut through the board parallel to the ends, said cuts dividing the board into first, second and third parts of substantially equal area, a cut through the second part parallel to and adjacent the perforate cut connecting the second and third parts, a cut score through the third part adjacent and parallel to its distal end, said cut score in the third part being closer to its distal end than to the perforate cut connecting the second and third parts, each of said last two cuts terminating short of the edges of the board, and a stripe of adhesive applied to the one surface of the board adjacent each of the last two cuts.

10. The method of making a mount comprising cutting part way through a rectangular blank from one side and perforating the blank so as to divide the blank into first, second and third parts of equal area, cutting completely through the second part adjacent to and parallel the perforate cut joining the second and third parts, cutting through the third part parallel to and adjacent the distal edge of the third part, applying adhesive to said second and third parts adjacent the cuts and extending beyond the ends of the cuts to the edges of the board, folding the first part and third part in opposite directions into engagement with opposite sides of the second part, adhesively securing the second and third parts to each other, applying a covering sheet to the rear surface of the third part, indenting the third part parallel to and adjacent the cut in the second part and then cutting through the second and third parts parallel to the cut in the third part and intersecting the indentation made in the third part.

11. A method according to claim 10, wherein the cover sheet is a wrapper coextensive with the rear surface of the third part having edge portions folded about the edges of the parts and secured to the front surface of the front ply.

12. The method of making a mount comprising making spaced parallel cuts transversely of a substantially rectangular blank so as to divide the blank into a center part and two end parts without disconnecting the parts, making a cut through the center part parallel to and adjacent the cut joining the center and one of the end parts, making a cut through the one end part parallel to and adjacent the distal end thereof, folding the end parts in opposite directions into engagement with the center part, fastening the one end part to the center part above the cut in the center part and below the cut in the end part, applying a wrapping sheet to the entire rear surface of said one end part about the edges and onto the front surface of the other end part, making an indentation in said one end part parallel to the cut in the center part, making a cut in said one end part parallel to the cut in said one end part, and joining the ends of the last cut with the ends of the indentation by making spaced parallel cuts which intersect the ends of the cuts in the center and end parts.

References Cited by the Examiner

UNITED STATES PATENTS

| | | | |
|---|---|---|---|
| 1,082,271 | 12/1913 | Karp | 248—465 |
| 2,863,243 | 12/1958 | Nichols | 40—152.1 |
| 2,946,545 | 7/1960 | Sampson | 248—459 |
| 3,021,631 | 2/1962 | Cross | 40—120 |
| 3,068,139 | 12/1962 | Cross | 156—213 |

CLAUDE A. LE ROY, *Primary Examiner.*

R. P. SEITTER, *Assistant Examiner.*